United States Patent
Shen

(10) Patent No.: US 8,024,842 B2
(45) Date of Patent: Sep. 27, 2011

(54) HINGE AND COLLAPSIBLE DEVICE UTILIZING THE SAME

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 382 days.

(21) Appl. No.: 12/331,403

(22) Filed: Dec. 9, 2008

(65) Prior Publication Data

US 2010/0101051 A1 Apr. 29, 2010

(30) Foreign Application Priority Data

Oct. 23, 2008 (CN) .......................... 2008 1 0305116

(51) Int. Cl.
*E05D 11/08* (2006.01)

(52) U.S. Cl. ................. 16/342; 16/386; 16/307; 16/373

(58) Field of Classification Search ............ 16/367, 16/386, 338–340, 330, 303, 380, 342, 307, 16/373; 361/679.06, 679.27, 679.28, 679.11, 361/679.12, 679.13; 379/433.12, 433.13; 455/575.1, 575.4, 575.8, 550.1, 90.3; 348/373, 348/333.06, 794

See application file for complete search history.

(56) References Cited

U.S. PATENT DOCUMENTS

| | | | | |
|---|---|---|---|---|
| 5,503,491 | A * | 4/1996 | Lu | 403/86 |
| 5,542,505 | A * | 8/1996 | Kempf | 188/77 W |
| 5,894,635 | A * | 4/1999 | Lu | 16/342 |
| 6,256,838 | B1 * | 7/2001 | Lu | 16/342 |
| 6,301,748 | B1 * | 10/2001 | Su-Man | 16/342 |
| 6,601,269 | B2 * | 8/2003 | Oshima et al. | 16/342 |
| 6,871,383 | B2 * | 3/2005 | Huang | 16/295 |
| 7,043,797 | B2 * | 5/2006 | Cau | 16/285 |
| 7,549,193 | B2 * | 6/2009 | Lee et al. | 16/342 |

* cited by examiner

*Primary Examiner* — Chuck Y. Mah
(74) *Attorney, Agent, or Firm* — Altis Law Group, Inc.

(57) ABSTRACT

A hinge includes a shaft sleeve, a shaft, and a spring. The shaft sleeve includes a shaft tube, and the shaft includes a fixing rod rotationally received in the shaft tube. The spring is received between the shaft and the shaft tube for guiding lubricant to lubricate the shaft and the shaft tube. The fixing rod is rotatably passed through the spring, and capable of rotating relative to the shaft tube.

8 Claims, 4 Drawing Sheets

HINGE AND COLLAPSIBLE DEVICE UTILIZING THE SAME

BACKGROUND

1. Technical Field

The present disclosure relates to hinges and collapsible devices utilizing the hinges and, particularly, to a hinge and a collapsible device utilizing the same.

2. Description of Related Art

A collapsible device, such as a notebook computer, or a clamshell mobile phone, generally including a main body and a display, often uses a hinge to interconnect the main body and the display. The hinge includes a female hinge member mounted to the cover and a male hinge member mounted to the base, thereby allowing the display to rotate with respect to the main body, and to be folded to the main body for saving space.

The female hinge member includes a shaft sleeve, and the male hinge member includes a split shaft rotatably received in the shaft sleeve. The split shaft is in frictional engagement with an inner wall of the shaft sleeve during rotation of the shaft relative to the shaft sleeve. Therefore, the display can maintain at any angle with respect to the main body by friction between the split shaft and the shaft sleeve. However, this hinge is not durable because the split shaft and the shaft sleeve are easily worn out. Even worse, after frequent usage and due to wear and tear, the split shaft and the shaft sleeve could no longer fit together tightly. As a result, the display cannot maintain stability at almost any angle with respect to the main body, which creates inconvenience for users.

DETAILED DESCRIPTION

Figure 1:
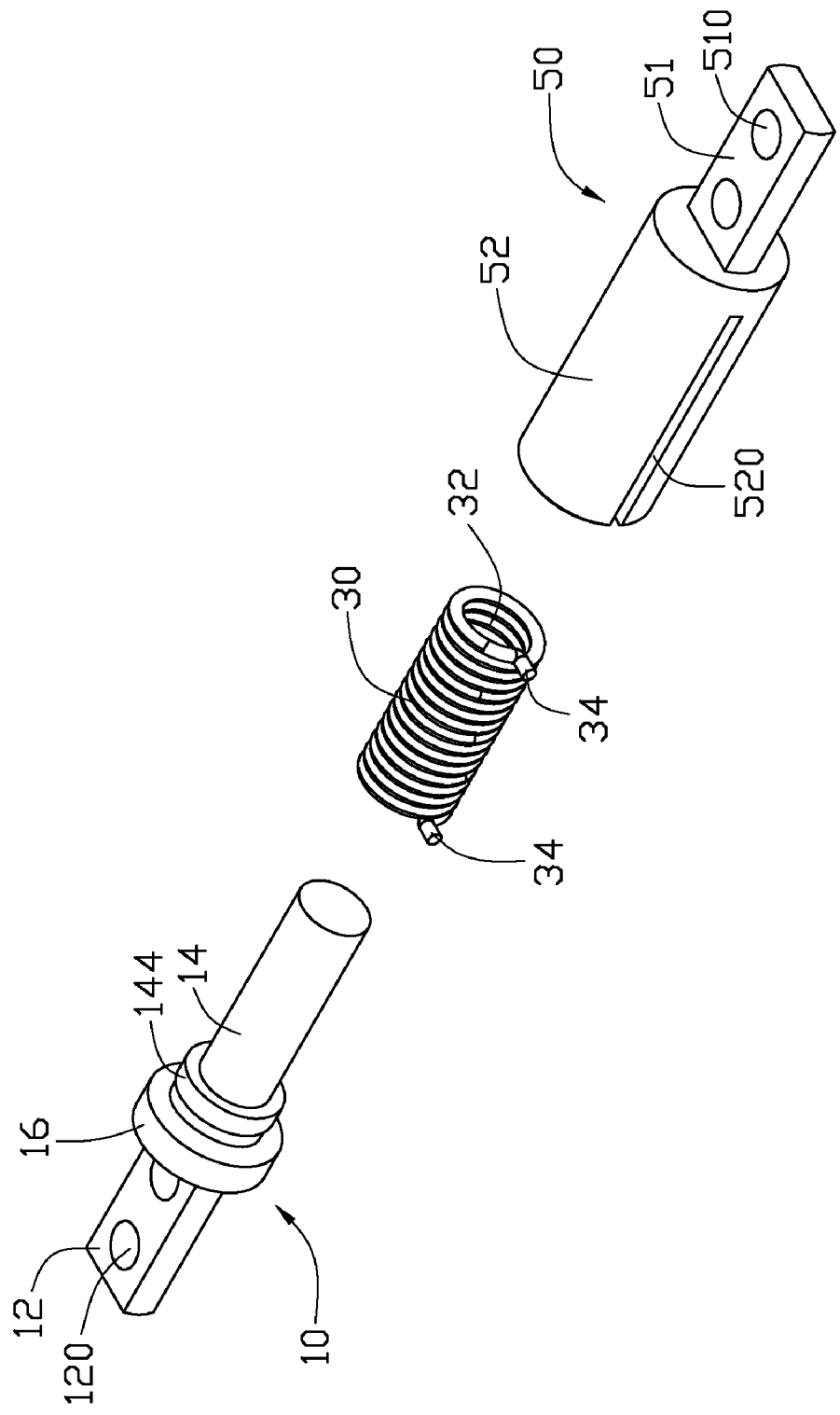
FIG. 1 is an exploded, isometric view of an exemplary embodiment of a hinge.
Figure 2:
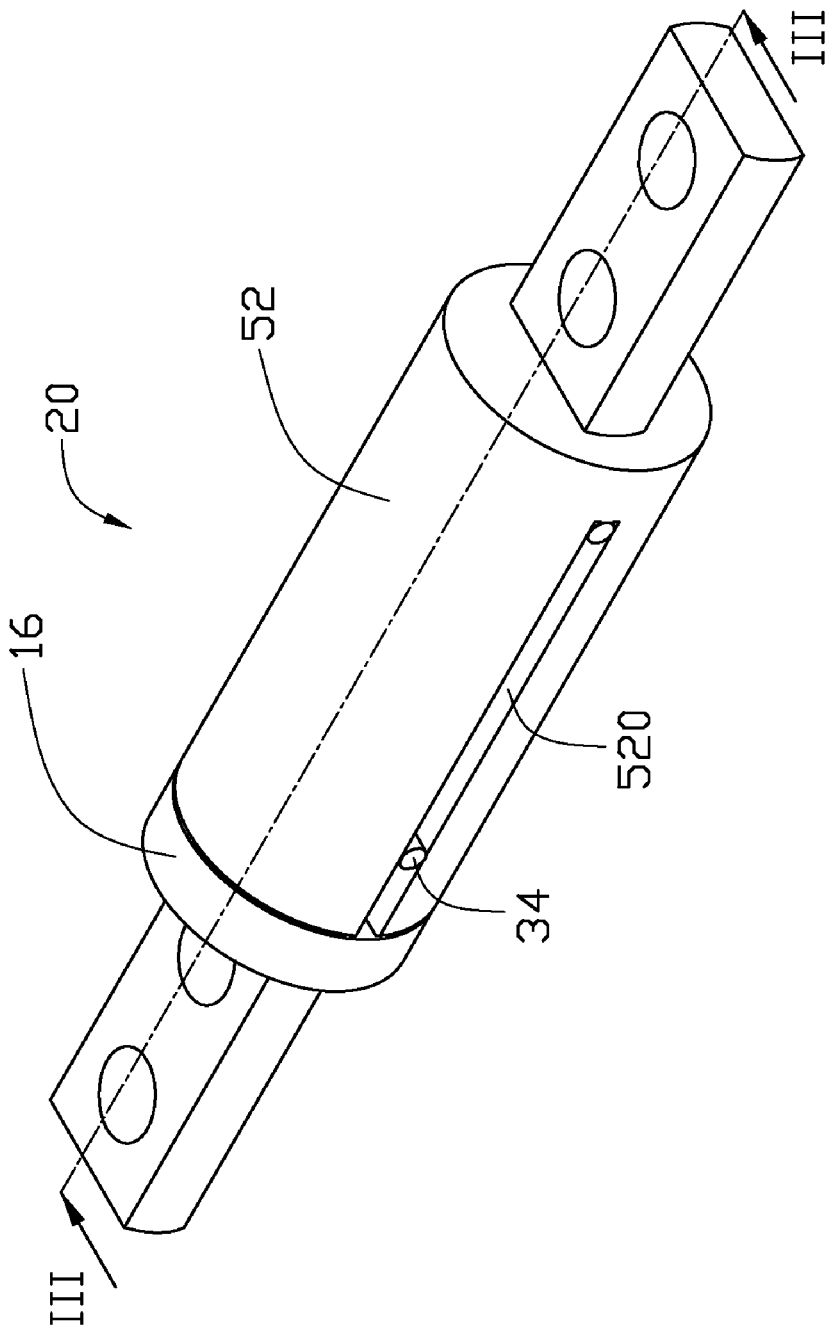
FIG. 2 is an assembled, isometric view of the hinge of FIG. 1.

Referring to FIGS. 1 and 2, an exemplary embodiment of a hinge 20 includes a shaft 10, a spring 30, such as a coil spring, mounted around the shaft 10, and a shaft sleeve 50 to receive the shaft 10 and the spring 30.

The shaft 10 includes a flat connecting portion 12 defining a plurality of fixing holes 120, a cylindrical-shaped fixing rod 14 opposite to the connecting portion 12, and a cylindrical-shaped resisting portion 16 positioned between the connecting portion 12 and the fixing rod 14. The outer diameter of the resisting portion 16 is greater than that of the fixing rod 14. A circular clamping protrusion 144 adjacent to the resisting portion 16 protrudes from a circumference of the fixing rod 14.

The spring 30 defines a through hole 32 in a center thereof for the fixing rod 14 passing through. Two fixing posts 34 extend from opposite ends of the spring 30.

The shaft sleeve 50 includes a hollow shaft tube 52 that includes a closed end and an opposite open end, and a flat securing portion 51 extending from the closed end. The securing portion 51 defines a plurality of fixing holes 510. The shape of the shaft tube 52 corresponds to the fixing rod 14, so that the fixing rod 14 can be rotationally engaged in the shaft tube 52. The shaft tube 52 axially defines a slot 520 in a circumference thereof from the open end toward the closed end, for enlarging the shaft tube 52 in response to the fixing rod 14 being inserted into the shaft tube 52. An inner wall of the shaft tube 52 defines a circular groove 522 (shown in FIG. 3), away from the securing portion 51, perpendicular to and communicating with the slot 520.

Figure 3:
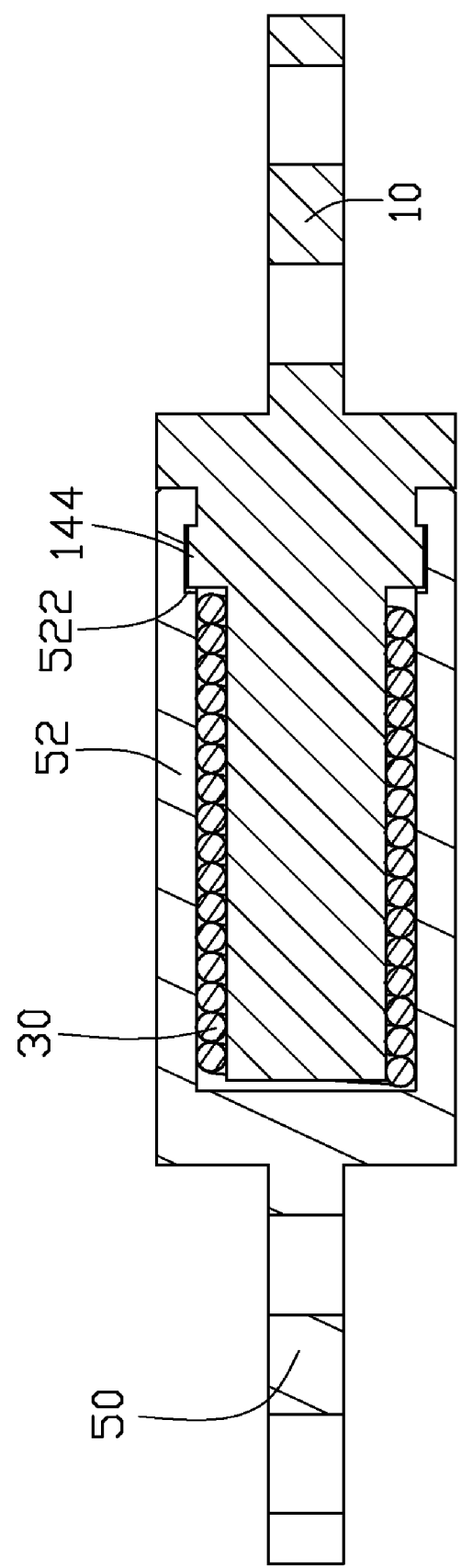
FIG. 3 is a sectional view taken along the line III-III of FIG. 2.

Referring to FIGS. 2 and 3, in assembly, the spring 30 is received in the shaft tube 52, with the fixing posts 34 engaged in the slot 520. Therefore, the spring 30 is immovably fixed to the shaft tube 52. The fixing rod 14 is rotationally inserted into the through hole 32, with the clamping protrusion 144 engaged in the groove 522, for preventing the spring 30 and the shaft 10 from disengaging from the shaft sleeve 50. Therefore, the spring 30 resists against the clamping protrusion 144 and the closed end of the shaft tube 52, and at the same time, the resisting portion 16 resists against the open end of the shaft tube 52.

Figure 4:
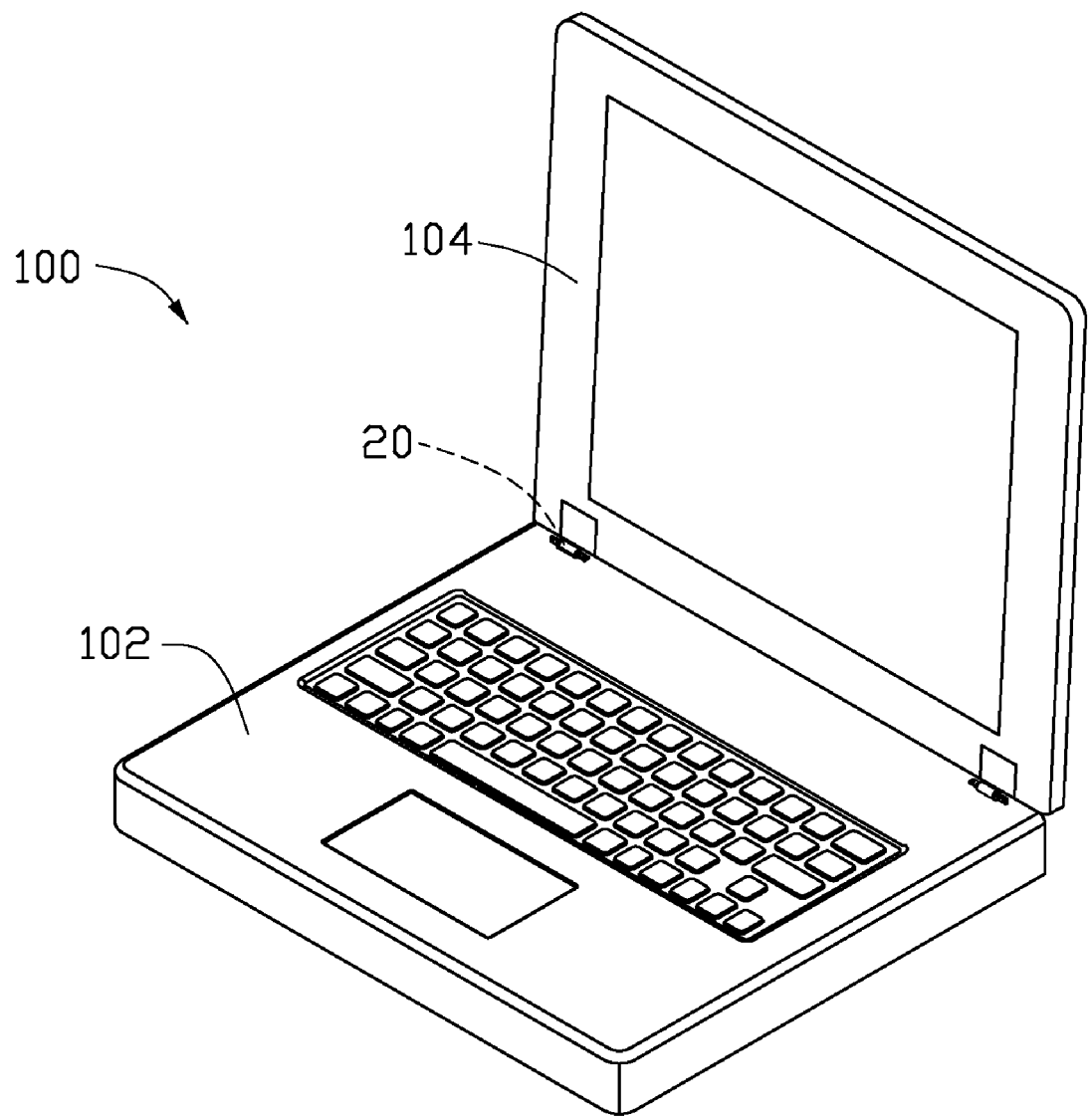
FIG. 4 is an isometric view of an exemplary embodiment of a collapsible device utilizing the hinge of FIG. 1.

Referring to FIG. 4, in use, the above-mentioned hinge 20 is utilized in a collapsible device 100, here for instance, in a notebook computer that includes a base 102 and a cover 104. The fixing holes 120 are configured for allowing fastening members, such as screws, bolts, or rivets, etc., to extend through, thereby fixing the shaft 10 to one of the cover 104 and the base 102. Similarly, the fixing holes 510 are configured for allowing fastening members, such as screws, bolts, or rivets, etc., to extend through, thereby the shaft sleeve 50 is fixed to the other one of the cover 104 and the base 102. Therefore, during rotation of the cover 104 or the base 102, the shaft 10 rotates relative to the shaft sleeve 50 and the spring 30. As a result, friction between the shaft 10 and the spring 30 stably maintains positions of the cover 104 at any angle with respect to the base 102. In this hinge 20, the spring 30 windingly contacts with the fixing rod 14, and at the same time the spring 30 and the fixing rod 14 form a space in the inner side of the shaft tube 52, configured for retaining lubricant, thereby resulting in reducing friction for reducing wear to the shaft 10. In addition, the lubricant is capable of sliding along windings of the spring 30, so that the fixing rod 14 can be fully lubricated.

Obviously, in other embodiments, the spring 30 may be around and fixed to the fixing rod 14.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A hinge comprising:
   a shaft sleeve comprising a shaft tube;
   a shaft comprising a fixing rod rotationally received in the shaft tube; and
   a coil spring received between the shaft and the shaft tube, configured for guiding lubricant to lubricate the shaft and the shaft tube;
   wherein the fixing rod is rotatably passed through the spring, and capable of rotating relative to the shaft tube; and
   wherein the shaft tube axially defines a through slot in a circumference thereof, two fixing posts extend from opposite ends of the spring to engage in the through slot.

2. The hinge of claim 1, wherein a groove is defined in an inner wall of the shaft tube, a clamping protrusion extends from the fixing rod, the protrusion is engaged in the groove.

3. The hinge of claim 1, wherein the shaft sleeve comprises a closed end and an open end opposite to the closed end, one end of the spring resists against the closed end, the shaft further comprises a resisting portion, the resisting portion resists against the open end of the shaft tube.

4. The hinge of claim 3, wherein the fixing rod axially extends from the resisting portion, a clamping protrusion extends from the fixing rod, a groove is defined in an inner wall of the shaft tube for receiving the protrusion.

5. A collapsible device comprising:
   a base;
   a hinge comprising:
      a shaft sleeve comprising a connecting portion, and a shaft tube extending from the connecting portion, wherein the shaft tube axially defines a through slot in a circumference thereof;
      a shaft comprising a fixing rod rotationally received in the shaft tube, and a securing portion opposite to the fixing rod; and
      a coil spring received between the shaft and the shaft tube, configured for guiding lubricant to lubricate the shaft and the shaft tube, wherein two fixing posts extend from opposite ends of the spring to engage in the through slot of the shaft tube; and
   a cover pivotally mounted to the base via the hinge;
   wherein the connecting portion is fixed to one of the cover and the base, and the securing portion is fixed to the other one of the cover and the base; the fixing rod is rotatably passed through the spring, and capable of rotating relative to the shaft tube.

6. The collapsible device of claim 5, wherein a groove is defined in an inner wall of the shaft tube, a clamping protrusion extends from the fixing rod, the protrusion is engaged in the groove.

7. The collapsible device of claim 5, the shaft sleeve comprises a closed end and an open end opposite to the closed end, one end of the spring resists against the closed end, the shaft further comprises a resisting portion, the resisting portion resists against the open end of the shaft tube.

8. The collapsible device of claim 7, wherein the fixing rod axially extends from the resisting portion, a clamping protrusion extends from the fixing rod, a groove is defined in an inner wall of the shaft tube for receiving the protrusion.

* * * * *